(12) United States Patent
Rosenlund

(10) Patent No.: US 6,663,133 B1
(45) Date of Patent: Dec. 16, 2003

(54) TRAILER HITCH ELEVATOR

(76) Inventor: Blaine L. Rosenlund, 1358 Olivine Ave., Mentone, CA (US) 92359

( * ) Notice: Subject to any disclaimer, the term of this patent is extended or adjusted under 35 U.S.C. 154(b) by 110 days.

(21) Appl. No.: 10/104,321

(22) Filed: Mar. 22, 2002

(51) Int. Cl.$^7$ ................................................. B60D 1/46
(52) U.S. Cl. .................................................. 280/490.1
(58) Field of Search .......................... 280/490.1, 400, 280/504, 511

(56) References Cited

U.S. PATENT DOCUMENTS

| | | | |
|---|---|---|---|
| 3,035,856 A | * 5/1962 | Mleczko et al. | ......... 280/490.1 |
| 3,400,949 A | * 9/1968 | Kendall | ............... 280/490.1 |
| 3,692,330 A | * 9/1972 | Kendall | ................. 280/402 |
| 4,033,601 A | * 7/1977 | Lindahl et al. | .......... 280/490.1 |
| 4,103,928 A | 8/1978 | Sheppard, Jr. | |
| 4,570,966 A | 2/1986 | Giboney et al. | |
| 5,205,700 A | 4/1993 | Lin et al. | |
| 5,234,310 A | 8/1993 | Driver | |
| 5,358,269 A | * 10/1994 | Jakeman et al. | ......... 280/490.1 |
| 5,607,279 A | 3/1997 | Hill et al. | |
| 5,845,921 A | 12/1998 | Stimac | |
| 5,975,553 A | 11/1999 | Van Vleet | |
| 6,042,137 A | 3/2000 | McIntosh | |
| 6,126,189 A | 10/2000 | Venis | |
| 6,129,371 A | 10/2000 | Powell | |

* cited by examiner

*Primary Examiner*—Lesley D. Morris
*Assistant Examiner*—Matt Luby

(57) ABSTRACT

A trailer hitch elevator includes a guide unit for fixable mounting at the rear of a towing vehicle, a track unit axially vertically movable as guided by the guide unit, a jackscrew journaled at the top of the track unit and threadingly engaging the guide unit, and a lock mechanism for locking the track unit in closely vertically spaced positions relative to the guide unit without subjecting the jackscrew to shock loading. One or more rearwardly oriented hitch receiver sockets are formed on the track unit for receiving a moduler trailer hitch. A wide range of vertical travel is provided with full engagement between the guide and track units, and with generous ground clearance in raised positions of the track unit.

21 Claims, 2 Drawing Sheets

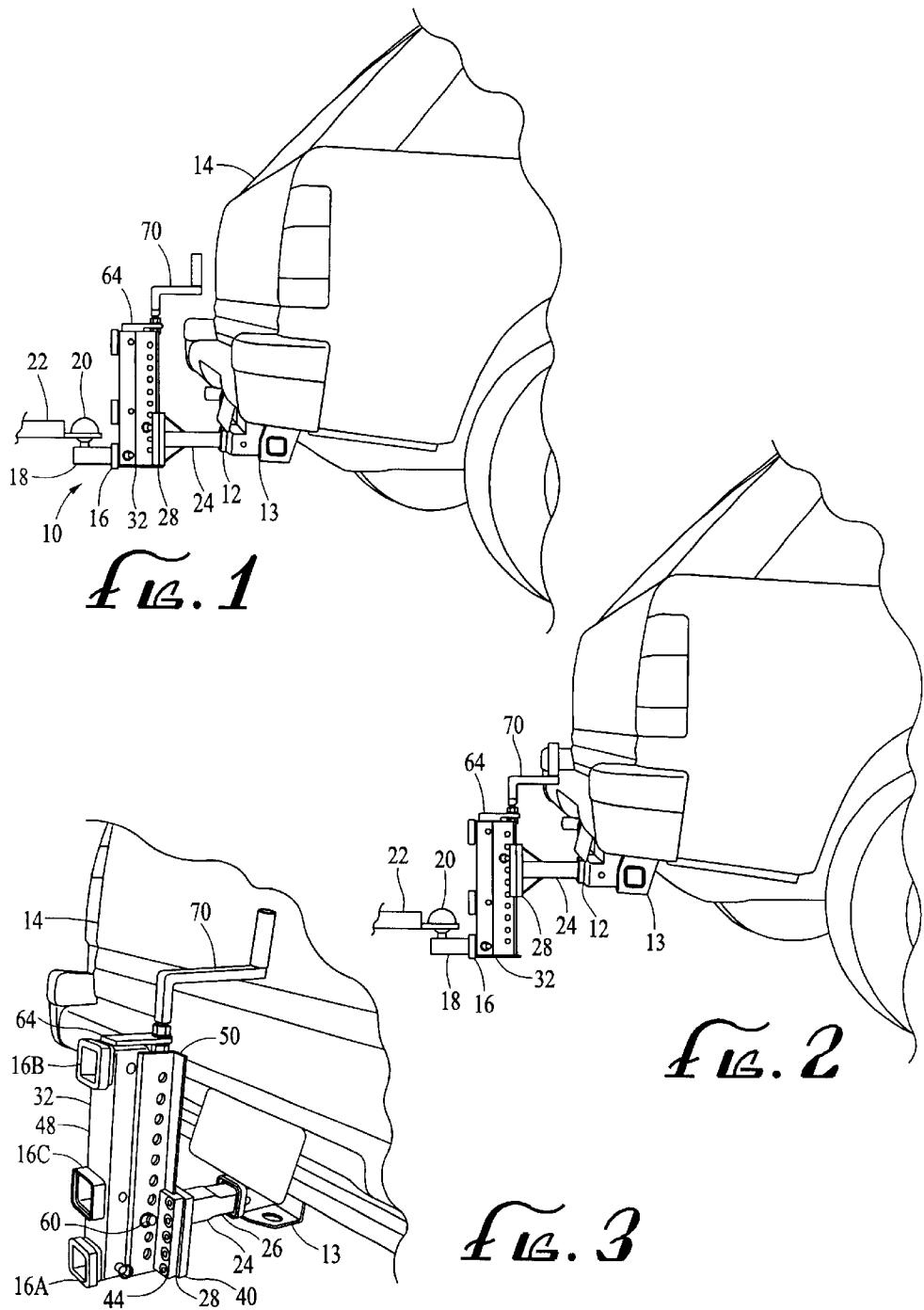

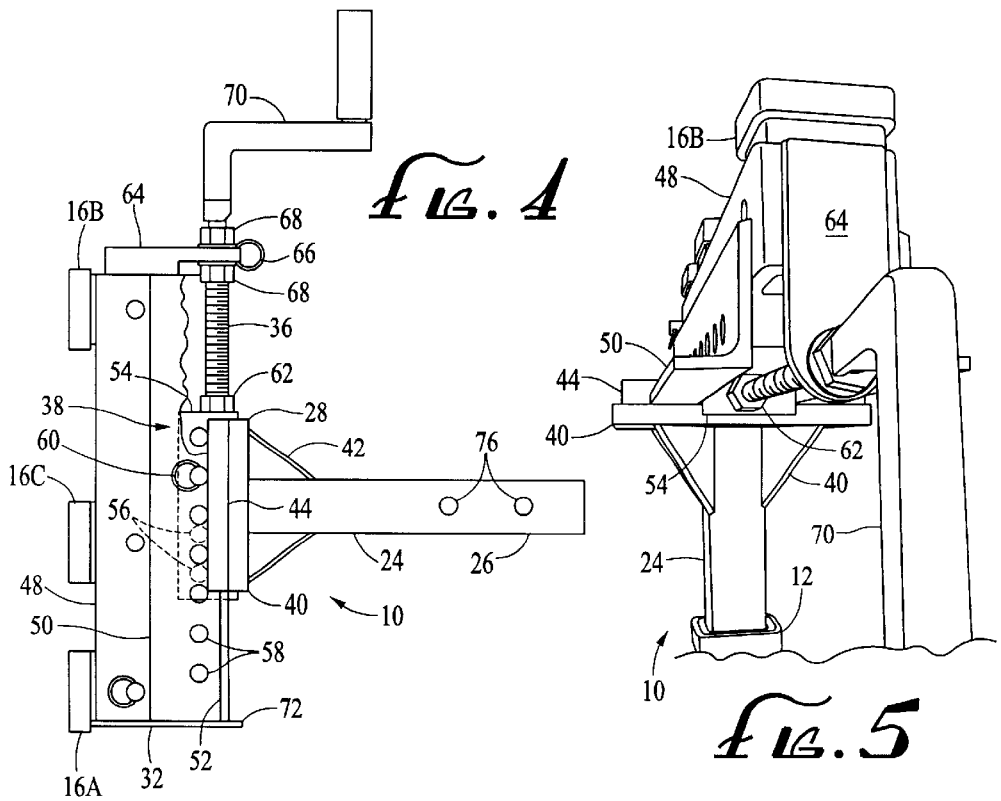
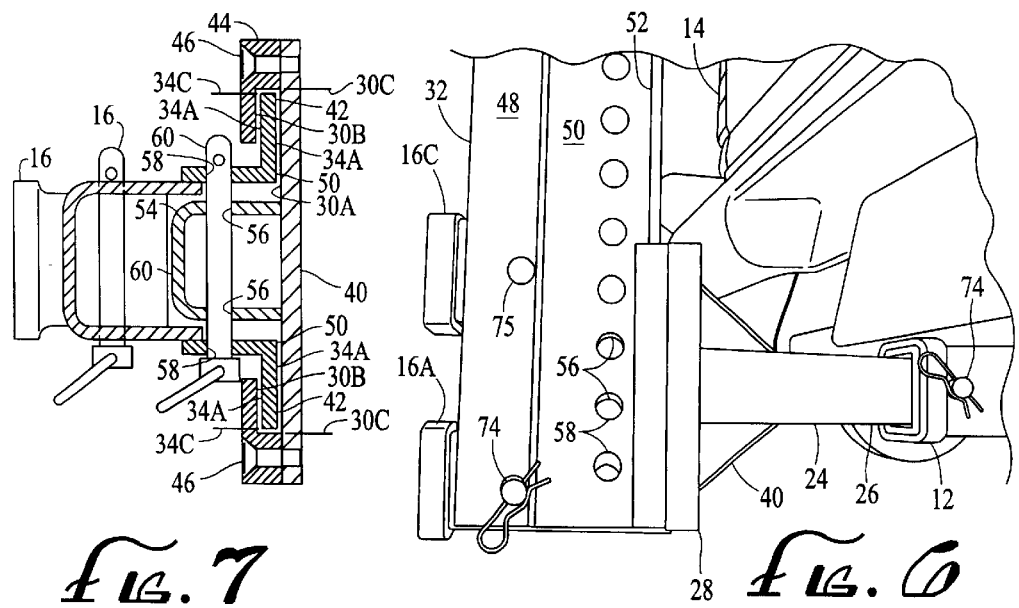

TRAILER HITCH ELEVATOR

BACKGROUND

The present invention relates to vehicle trailer hitch adapters, and more particularly to adapters that provide vertically variable offset mounting of trailer hitches relative to fixed hitch mounting structure of towing vehicles.

Traditionally, the towing of a trailer (or towed vehicle) by a towing vehicle such as an automobile involves fixably mounting of a hitch ball to a supporting structure of the towing vehicle, such as to a rear bumper of the vehicle. Conventional hitch balls have an approximately spherical head portion, a flange portion with a threaded stem, and a neck portion spacing the head portion above the flange portion. A typical mounting, such as is presently found on some light pick-up trucks, includes a hole formed in a shelf portion of the rear bumper for receiving the stem, which is fastened by a nut that threadingly engages the stem. Other mountings include an adapter having a projecting tab member counterpart of the bumper shelf portion that is clamped to a conventional rear bumper (and which may incorporate means for selective vertical offset of the tab member); and a hitch mount that fixably supports the tab member to a chassis frame of the vehicle, either by bolting, clamping, or welding. In recent times so-called "modular" hitches have become common, wherein a longitudinally extending rectangular socket is formed in the hitch mount for receiving a tubular hitch shank. A hole can be formed in a rearwardly projecting portion of the shank itself for receiving the stem of the ball (the rearwardly projecting portion forming a counterpart of the tab member), but more commonly a counterpart of the tab member is welded to the shank in offset relation thereto. The shank is fixedly retained in the socket by a clevis pin or bolt fastener that engages aligned transverse openings of the shank and the socket. As used below, the term "modular hitch" means the shank and tab member, being typically provided in a variety of vertical offsets from which selection is made for matching the mounted height of the a ball to a desired height of a trailer hitch to be coupled thereto.

In practice it has been found advantageous to provide for vertical adjustment of the trailer hitch ball relative to the towing vehicle chassis without having to replace the modular hitch. This avoids the need for a correct a priori offset selection, and/or for exchanging the modular hitch to accommodate different towed vehicles and/or different loadings of the towed and/or towing vehicle. See, for example, U.S. Pat. No. 4,033,601 to Lindahl et al., and U.S. Pat. No. 4,429,895 to Hunter. Further, it is advantageous to be able to adjust the vertical offset while the towed vehicle is already coupled to the ball and both vehicles are loaded. U.S. Pat. No. 4,103,928 to Sheppard, Jr., discloses such a device, including a mounting plate for vertically oriented attachment to the trailer hitch of the towing vehicle, a slide plate moveable up and down with respect to the mounting plate by means of a jack screw, and a tongue projecting rearwardly from the slide plate for receiving the ball. The slide plate is confined between the mounting plate and a pair of laterally spaced face plates that overhang inwardly from a pair of spacer plates, the jack screw being supported by a thrust bearing that is received in a top plate that is mounted at upper extremities of the face plates, spacer plates, and the mounting plate, an upper extremity of the jack screw is formed to receive a wrench or other device by which the screw is turned, and a locking device selectively engages the upper extremity to secure the screw against rotation. A traveler nut that engages the jack screw is captured at an upper extremity of a box structure that is fixed on the slide plate. Also, several set screws are threaded through the face plates for clamping the slide plate.

The adjustable hitch of Sheppard, Jr., has a number of disadvantages. For example:

1. The jack screw, thrust bearing, and traveler nut are subject to excessive wear and premature failure in that the arrangement of set screws is believed to be ineffective for preventing shock loading of the jack screw during towing;

2. The arrangement of set screws is awkward to use in that only some of the set screws are located for clamping the slide plate at any particular vertical position thereof, those not clamping the slide plate being loose and subject to falling out unless they are tightened in a way that blocks subsequent adjustment of the slide plate;

3. The hitch is excessively bulky in relation to the range of adjustment provided, in that the slide plate cannot be raised above the tops of the face plates, being blocked by the top plate, and the vertical height of engagement of the slide plate is diminished to the extent that the slide plate projects below the mounting, spacer, and face plates;

4. The hitch provides an excessively limited amount of ground clearance in relation to elevated positions of the tongue as a consequence of the above disadvantage, particularly when a range of adjustment of the tongue to proximate ground level is required;

5. The hitch is awkward to use in that a separate device is required for turning the jack screw, which device must be removed during locking and unlocking of the jack screw; and 6. The hitch is excessively difficult to maintain in that exposed sliding surfaces of the face plates, spacer plate, and mounting plate are relatively inaccessible for cleaning.

Thus there is a need for an adjustable trailer hitch apparatus that overcomes the disadvantages of the prior art.

SUMMARY

The present invention meets this need by providing a trailer hitch apparatus with a wide range of vertical adjustment down to proximate ground level, yet has generous ground clearance in its raised positions, using an elevator mechanism that is not subject to shock loading during towing. In one aspect of the invention, the apparatus includes a base member adapted for fixable mounting onto the towed vehicle; a guide unit rigidly connected to a rear extremity of the base member and defining a vertically oriented guide surface when the base member is mounted onto the towing vehicle; a track unit defining a track surface engaging the guide surface for axially guided movement relative thereto; means on the track unit for connecting a coupling receiver; an elevator mechanism connected between the guide unit and the track unit for raising and lowering the track unit; and a lock mechanism for positively locking the track member in a selectable one of a plurality of axially spaced positions relative to the guide unit.

The guide surface can include a plurality of guide surface portions, each of the guide surface portions being generally inwardly facing relative to others of the guide surface portions, the track surface including a corresponding plurality of generally outwardly facing track surface portions. The track surface can extend fully between opposite end extremities of the guide surface over a full range of travel of the track member. The guide surface can include a rearwardly facing guide surface portion, a spaced pair of forwardly facing guide surface portions, and a laterally spaced pair of inwardly facing guide surface portions. The guide unit can include a guide plate defining the rearwardly facing guide surface portion, and a pair of guide members, the guide members each being fixably connected to the guide plate and defining respective ones of the forwardly facing and inwardly facing guide surface portions.

The track unit can include a column member and a laterally spaced pair of track members fixedly connected to the column member, the track surface being formed on the track members. Each of the track members can define a forwardly facing first track surface, a rearwardly facing second track surface disposed rearwardly of the first track surface, and a laterally outwardly facing third track surface.

The elevator mechanism can include a jackscrew journaled proximate an upper extremity of the track unit and having threaded engagement with the guide unit proximate an upper extremity thereof. The hitch apparatus can further include a crank for manually turning the jackscrew. The crank can be connected to an upper extremity of the jackscrew.

The lock mechanism can include a registration member fixably mounted on the guide unit and having a transverse lock passage formed therein, the track unit having an axially spaced plurality of lock openings formed therein for selective alignment with the lock passage during operation of the elevator mechanism, and a lock pin for engaging the lock passage and the selected one of the lock openings. The lock passage can be one of a vertically spaced plurality of lock passages wherein at least one spacing of the lock passages is different than a spacing of the lock openings for selectable locking of the track unit at position spacings being less than an axial spacing of the lock openings.

The means for connecting can include a rearwardly facing first socket member for receiving a modular trailer hitch, the first socket member being fixedly located proximate a lower extremity of the track member and having an opening formed in opposite walls thereof for receiving a hitch retainer pin by which to secure the trailer hitch in fixed engagement with the first socket member. The hitch apparatus can include a hitch stem member of the modular trailer hitch, the hitch stem member being configured for mounting a hitch ball and having a hitch shank portion being insertable into the first socket member, the hitch shank portion having a transverse passage for receiving the hitch retainer pin. The hitch apparatus can further include a hitch ball of the modular trailer hitch, the hitch ball being mountable onto the stem member opposite the shank portion thereof. The means for connecting can further include a rearward facing second socket member counterpart of the first socket member, the second socket member being spaced above the first socket member. The second socket member can be located proximate an upper extremity of the track member. The means for connecting can further include a rearward facing third socket member counterpart of the first socket member, the third socket member being spaced between the first and second socket members.

The base member-can include a forwardly projecting base stem member having a base shank portion for insertion into a rearwardly opening hitch socket of the towing vehicle, the base stem having a transverse base retainer passage for receiving a hitch retainer pin when the retainer pin also engages a retainer opening of the hitch socket. The base retainer passage can be one of a longitudinally spaced plurality of base retainer passages for longitudinally selective mounting of the apparatus onto the towed vehicle.

DRAWINGS

These and other features, aspects, and advantages of the present invention will become better understood with reference to the following description, appended claims, and accompanying drawings, where:

FIG. 1 is a side perspective view of the rear of a towing vehicle coupled to the front of a towed vehicle using adjustable hitch apparatus according to the present invention, the apparatus being in a raised condition;

FIG. 2 is a perspective view as in FIG. 1, the apparatus being in a lowered condition;

FIG. 3 is an enlarged side-oblique perspective view of the apparatus of FIG. 1 installed on the towing vehicle;

FIG. 4 is a partially fragmentary side view of the apparatus of FIG. 1, in a condition intermediate that of FIGS. 1 and 2;

FIG. 5 is plan-oblique perspective view of the apparatus of FIG. 1 and its connection to the rear of the towing vehicle;

FIG. 6 is a detail side perspective view of the apparatus of FIG. 1 and its connection to the towing vehicle; and FIG. 7 is a plan diagram view showing elements defining guide and track surface portions of the apparatus of FIG. 1.

DESCRIPTION

The present invention is directed to an adjustable trailer hitch apparatus that is particularly versatile and effective for a wide range of towing applications. With reference to FIGS. 1–7 of the drawings, a trailer hitch elevator apparatus 10 is removably connected to a fixedly mounted vehicle hitch socket 12 that is formed in a hitch bracket 13 of a towing vehicle 14, the apparatus 10 having one or more rearwardly projecting receiver sockets 16 that holds a modular hitch 18 to which a hitch coupling 20 connects the front of a towed vehicle or trailer 22. According to the present invention, the apparatus 10 includes a base member 24 having a forwardly projecting shank portion 26 for engaging the vehicle hitch socket 12, a rear extremity of the base member 24 being rigidly connected to a guide unit 28 that defines a vertically oriented guide surface 30 which is further described below in connection with FIG. 7. A track unit 32 having the first receiver socket 16 fixedly located thereon is movably connected to the guide unit 28, being axially guided by engagement of a track surface 34 of the track unit with the guide surface 30 of the guide unit 28. The track unit 32 is vertically adjustably supported by a jackscrew 36 and a lock mechanism 38, the jackscrew being journaled proximate an upper extremity of the track unit 32 and having threaded engagement with the guide unit 28 as further described below.

In an exemplary configuration of the hitch apparatus 10, the guide unit 28 includes a guide plate 40 that is welded to the base member 24, a plurality of divergently oriented gusset members 42 being welded about the base member for reinforcing the guide plate 40, the rearwardly facing side of the guide plate forming a first guide surface portion 30A as shown in FIG. 7. Respective laterally spaced and vertically oriented guide members 44 are fixably connected against the rear of the guide plate 38 by a plurality of guide fasteners 46, the guide members 44 forming pairs of forwardly facing second guide surface portions 30B and laterally inwardly facing third guide surface portions 30C.

The track unit 32 includes a column member 48 having respective L-shaped track members 50 welded against opposite sides thereof, one receiver socket, designated first receiver socket 16A being formed at a lower extremity of the column member 48. Laterally outwardly projecting flanges 52 of the track members 50 define respective forwardly facing first track surface portions 34A, rearwardly facing second track surface portions 34B, and laterally outwardly facing third track surface portions 34C that slidably engage corresponding portions of the guide surface 30.

The lock mechanism 38 includes a vertically oriented registration member 54 having at least one but preferably a vertically spaced plurality of lock passages 56 formed therein as further described below, the registration member 54 being welded at the rear of the guide plate 40. At least one of the track members 50 has vertically spaced lock openings 58 formed therethrough, and a lock pin 60 is provided for selectively engaging one of the lock passages 56 and a lock opening 58 to positively lock the track unit in a selected one of a plurality of axially spaced positions relative to the guide unit 28. In a preferred configuration of the lock mechanism 40, the registration member is located between the track members 50, and aligned counterparts of the lock openings 58 are formed in both track members 50, the lock pin being inserted through the registration member 54 and both track members 50. The preferred plurality of lock passages 56 is at least one vertical spacing being different than a spacing of the lock openings 58 of the track members 50 for selectable locking of the track unit 32 at position spacings being less than a vertical or axial spacing of the lock openings 58. Thus the lock mechanism 38 preferably provides selectable locked positions that are more closely spaced than would be obtainable using a single one of the lock passages 56.

A jackscrew nut 62 is fixedly supported on the registration member 54 proximate an upper extremity of the guide unit 28, the jackscrew nut providing the threaded engagement of the jackscrew 36 with the guide unit. A bearing support 64 projects forwardly from an upper extremity of the column member 48, the jackscrew 36 extending through the support 64 and having a pair of thrust washers 66 rotatably bearing against opposite faces of the support and being retained between respective lock nuts 68 on the jackscrew 36. Being thus journaled to the track unit 32 and threadingly engaging the guide unit 28, the track unit can be raised and lowered by rotation of the jackscrew 36 over a range of travel when the lock pin is removed from engagement with the registration member 54. A suitable crank 70 facilitates rotation of the jackscrew 36.

A stop tab 72 projects forwardly from a bottom extremity of the track unit 32, the tab 72 defining an upper travel limit of the track unit (shown in FIGS. 1, 3, 4, and 6). A lower travel limit is reached when the lowermost of the lock nuts 68 abuts the jackscrew nut 62. Preferably the track surface 34 extends fully between opposite end extremities of the guide surface over the full range of travel of the track unit between the upper and lower travel extremities. This is achieved in the above-described exemplary configuration of the elevator apparatus by the guide members 44 extending to upper and lower extremities of the guide plate 40, and the track members 50 extending from even with the stop tab 72 to alignment with the bottom of the lower lock nut 68, as adjusted for the extent that the top of the jackscrew nut 62 is not horizontally aligned with the top of the guide plate 40.

Counterparts of the lock pin, designated anchor pin 74, are provided for securing the base member shank portion 26 in the vehicle hitch socket 12 as well as securing the modular hitch 18 in a selected one of the receiver sockets 16 in a conventional manner, the pin being inserted through a corresponding pin opening 75 that is formed through the column member 48 and structure of the receiver socket 16 as shown in FIG. 6. Further, the shank portion 26 is provided with an axially spaced plurality of transverse pin passages 76 as shown in FIG. 4 for selective spacing of the guide unit 28 behind the towing vehicle when the hitch bracket 13 is appropriately configured for deep penetration of the shank portion 26.

An experimental prototype of the apparatus 10 has been built and successfully tested under conditions of launching a power boat from a towed trailer, and retrieving the boat onto the trailer. In these tests, lowering of the track unit 32 such that a modular hitch 18 engaging the first receiver socket 16A is proximate ground level greatly facilitates loading and unloading of the boat when the towing vehicle 14 and the trailer 22 are on a sloping boat ramp. The prototype apparatus was constructed with the base member 24 being a steel bar of 2-inch square cross-section, 12 inches long, the front extremity being welded to the center of the guide plate 40 (8.5 inches wide, 6.5 inches high, 0.75 inch thick)

Although the present invention has been described in considerable detail with reference to certain preferred versions thereof, other versions are possible. For example, any actuator, such as a hydraulic actuator, can be substituted for the jackscrew 36 and jackscrew nut 62 to provide a suitable elevator mechanism. Therefore, the spirit and scope of the appended claims should not necessarily be limited to the description of the preferred versions contained herein.

What is claimed is:

1. A trailer hitch apparatus for connecting a towed vehicle having a hitch coupling at adjustable height to a towing vehicle, comprising:
   (a) a base member adapted for fixable mounting onto the towed vehicle;
   (b) a guide unit rigidly connected to a rear extremity of the base member and defining a vertically oriented guide surface when the base member is mounted onto the towing vehicle;
   (c) a track unit defining a track surface engaging the guide surface for axially guided movement relative thereto;
   (d) means on the track unit for connecting a coupling receiver;
   (e) an elevator mechanism connected between the guide unit and the track unit for raising and lowering the track unit; and
   (f) a lock mechanism for positively locking the track member in a selectable one of a plurality of axially spaced positions relative to the guide unit.

2. The hitch apparatus of claim 1, wherein the guide surface comprises a plurality of guide surface portions, each of the guide surface portions being generally inwardly facing relative to others of the guide surface portions, the track surface comprising a corresponding plurality of generally outwardly facing track surface portions.

3. The hitch apparatus of claim 2, wherein the track surface extends fully between opposite end extremities of the guide surface over a full range of travel of the track member.

4. The hitch apparatus of claim 2, wherein the guide surface comprises a rearwardly facing guide surface portion, a spaced pair of forwardly facing guide surface portions, and a laterally spaced pair of inwardly facing guide surface portions.

5. The hitch apparatus of claim 4, wherein the guide unit comprises a guide plate defining the rearwardly facing guide surface portion, and a pair of guide members, the guide members each being fixably connected to the guide plate and defining respective ones of the forwardly facing and inwardly facing guide surface portions.

6. The hitch apparatus of claim 1, wherein the track unit comprises a column member and a laterally spaced pair of track members fixedly connected to the column member, the track surface being formed on the track members.

7. The hitch apparatus of claim 6, wherein each of the track members defines a forwardly facing first track surface, a rearwardly facing second track surface disposed rearwardly of the first track surface, and a laterally outwardly facing third track surface.

8. The hitch apparatus of claim 1, wherein the elevator mechanism comprises a jackscrew journaled proximate an upper extremity of the track unit and having threaded engagement with the guide unit proximate an upper extremity thereof.

9. The hitch apparatus of claim 8, further comprising a crank for manually turning the jackscrew.

10. The hitch apparatus of claim 9, wherein the crank is connected to an upper extremity of the jackscrew.

11. The hitch apparatus of claim 1, wherein the lock mechanism comprises a registration member fixably mounted on the guide unit and having a transverse lock passage formed therein, the track unit having an axially spaced plurality of lock openings formed therein for selective alignment with the lock passage during operation of the elevator mechanism, and a lock pin for engaging the lock passage and the selected one of the lock openings.

12. The hitch apparatus of claim 11, wherein the lock passage is one of a vertically spaced plurality of lock passages wherein at least one spacing of the lock passages is different than a spacing of the lock openings for selectable locking of the track unit at position spacings being less than an axial spacing of the lock openings.

13. The hitch apparatus of claim 1, wherein the means for connecting comprises a rearwardly facing first socket member for receiving a modular trailer hitch, the first socket member being fixedly located proximate a lower extremity of the track member and having an opening formed in opposite walls thereof for receiving a hitch retainer pin by which to secure the trailer hitch in fixed engagement with the first socket member.

14. The hitch apparatus of claim 13, including a hitch stem member of the modular trailer hitch, the hitch stem member being configured for mounting a hitch ball and having a hitch shank portion being insertable into the first socket member, the hitch shank portion having a transverse passage for receiving the hitch retainer pin.

15. The hitch apparatus of claim 14, further including a hitch ball of the modular trailer hitch, the hitch ball being mountable onto the stem member opposite the shank portion thereof.

16. The hitch apparatus of claim 13, wherein the means for connecting further comprises a rearward facing second socket member counterpart of the first socket member, the second socket member being spaced above the first socket member.

17. The hitch apparatus of claim 16, wherein the second socket member is located proximate an upper extremity of the track member.

18. The hitch apparatus of claim 17, wherein the means for connecting further comprises a rearward facing third socket member counterpart of the first socket member, the third socket member being spaced between the first and second socket members.

19. The hitch apparatus of claim 1, wherein the base member comprises a forwardly projecting base stem member having a base shank portion for insertion into a rearwardly opening hitch socket of the towing vehicle, the base stem having a transverse base retainer passage for receiving a hitch retainer pin when the retainer pin also engages a retainer opening of the hitch socket.

20. The hitch apparatus of claim 19, wherein the base retainer passage is one of a longitudinally spaced plurality of base retainer passages for longitudinally selective mounting of the apparatus onto the towed vehicle.

21. A trailer hitch apparatus for a vehicle having a vehicle hitch socket for receiving a modular trailer hitch, the apparatus comprising:

(a) a base member adapted for fixable mounting onto the towed vehicle;

(b) a guide unit rigidly connected to a rear extremity of the base member and defining a vertically oriented guide surface when the base member is mounted onto the towing vehicle, the guide surface comprising a plurality of guide surface portions, each of the guide surface portions being generally inwardly facing relative to others of the guide surface portions;

(c) a track unit defining a track surface engaging the guide surface for axially guided movement relative thereto, the track surface comprising a plurality of generally outwardly facing track surface portions corresponding to the guide surface portions;

(d) means on the track unit for connecting a coupling receiver;

(e) an elevator mechanism connected between the guide unit and the track unit for raising and lowering the track member; and (f) a lock mechanism for positively locking the track member in a selectable one of a plurality of axially spaced positions relative to the guide member.

* * * * *